United States Patent [19]

Stone

[11] Patent Number: 4,523,849
[45] Date of Patent: Jun. 18, 1985

[54] FRONT LIGHTED OPTICAL TOOLING METHOD AND APPARATUS

[75] Inventor: William J. Stone, Kansas City, Mo.

[73] Assignee: The United States of America as represented by the United States Department of Energy, Washington, D.C.

[21] Appl. No.: 509,554

[22] Filed: Jun. 30, 1983

Related U.S. Application Data

[63] Continuation-in-part of Ser. No. 347,758, Feb. 11, 1982, Pat. No. 4,501,473.

[51] Int. Cl.$^3$ .............................................. G01B 11/24
[52] U.S. Cl. .................................. 356/369; 350/399; 350/403; 350/407; 356/370
[58] Field of Search ............... 350/370, 403, 384, 399, 350/406, 407, 276, 111; 356/399, 445, 364, 366, 369, 124, 125, 252

[56] References Cited

U.S. PATENT DOCUMENTS

| | | | |
|---|---|---|---|
| 2,318,705 | 5/1943 | Morgan | 356/445 |
| 3,533,702 | 10/1970 | Hock et al. | 356/167 |
| 3,759,618 | 9/1973 | Rogers et al. | 356/156 |
| 3,778,169 | 12/1973 | Adams | 353/172 |
| 3,870,416 | 3/1975 | Brady et al. | 356/138 |

OTHER PUBLICATIONS

Optical Tooling, Kissam (McGraw Hill Book Co. 1962).
Article of Unknown Source and Date Entitled Measurement of Spherical and Cylindrical Radii, Gabloffsky.
Prism and Lens Making, Twyman, Hilger and Watts Ltd.
Modern Optical Engineering, Smith (McGraw Hill Book Co., p. 448).
Selective Experiments in Physics, 1940.
Zeiss Advertisement Sheet.
Gauges and Fine Measurements, Rolt 1929

Primary Examiner—Bruce Y. Arnold
Attorney, Agent, or Firm—James H. Chafin; Albert Sopp; Judson R. Hightower

[57] ABSTRACT

An optical tooling method and apparatus uses a front lighted shadowgraphic technique to enhance visual contrast of reflected light. The apparatus includes an optical assembly including a fiducial mark, such as cross hairs, reflecting polarized light with a first polarization, a polarizing element backing the fiducial mark and a reflective surface backing the polarizing element for reflecting polarized light bypassing the fiducial mark and traveling through the polarizing element. The light reflected by the reflecting surface is directed through a second pass of the polarizing element toward the frontal direction with a polarization differing from the polarization of the light reflected by the fiducial mark. When used as a tooling target, the optical assembly may be mounted directly to a reference surface or may be secured in a mounting, such as a magnetic mounting. The optical assembly may also be mounted in a plane defining structure and used as a spherometer in conjunction with an optical depth measuring instrument. A method of measuring a radius of curvature of an unknown surface includes positioning the spherometer on a surface between the surface and a depth measuring optical instrument. As the spherometer is frontally illuminated, the distance from the depth measuring instrument to the fiducial mark and the underlying surface are alternately measured and the difference in these measurements is used as the sagittal height to calculate a radius of curvature.

20 Claims, 8 Drawing Figures

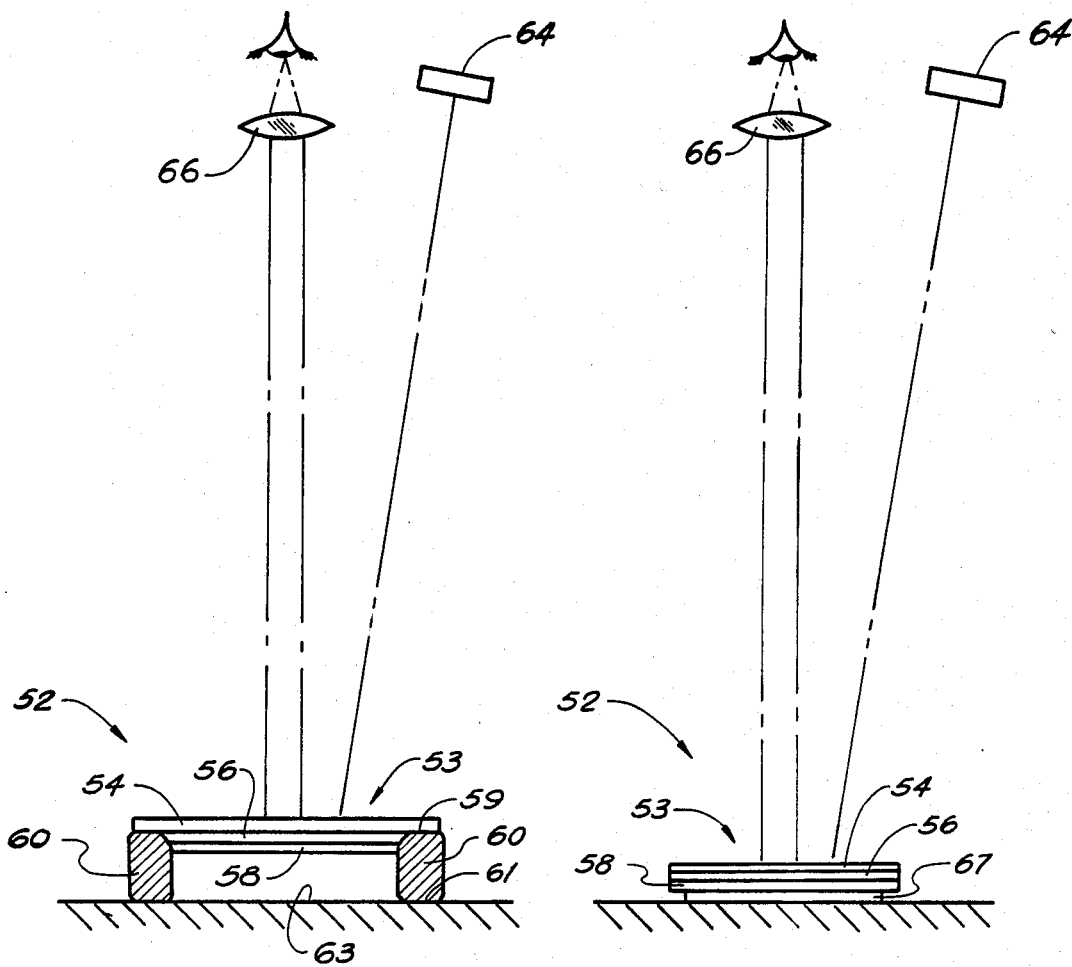
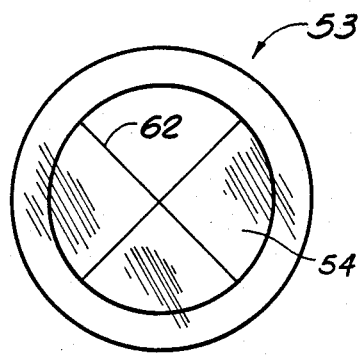
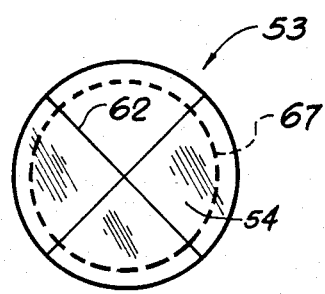

FRONT LIGHTED OPTICAL TOOLING METHOD AND APPARATUS

The United States Government has rights to this invention pursuant to contract No. DE-AC04-76DP-00613 between the United States Department of Energy and the Bendix Corportion

RELATED APPLICATION

This application is a continuation-in-part application of Ser. No. 347,758, filed Feb. 11, 1982 entitled Front Lighted Shadowgraphic Method and Apparatus now U.S. Pat. No. 4,501,473.

TECHNICAL FIELD

The present invention relates to the field of optical tooling and more specifically to an apparatus and method for providing front lighted, high contrast images in an optical apparatus. The invention will be specifically disclosed in connection with an optical assembly which may be used as a tooling target or as a component of a new kind of spherometer; i.e., an opto-spherometer.

BACKGROUND OF THE INVENTION

In the manufacture of many precision products, it is necessary to lay out points and lines in precise relationship to reference planes or fiducial points. For example, the jigs and fixtures used to manufacture diverse products ranging from huge aircraft to microminiature electronics must be precisely located with respect to some reference point or plane. Typically, such points and surfaces are mapped out optically in relationship to a fixed fiducial mark established by an optical tooling target. The nature and sophistication of the optical target varies with the application. The optical target may be as simple as a hole drilled thru an I-beam or as sophisticated as an automatic alignment fiducial built into the integrated circuit photomask of modern optical microlithography. Once a primary fiducial mark is established, all measurements are made with respect to that primary fiducial.

In order to be effective, the fiducial must have adequate brightness and contrast to visually locate and distinguish the location. Moreover, the location of the fiducial mark must be certifiable relative to some significant point or plane in the work.

To enhance the visibility of a fiducial mark, optical targets have been provided with self-contained lighting systems wherein lights are positioned behind fudicial cross lines for illumination. One prior art optical target arrangement, for example, consists of a circular transparent disc with a black pattern fiducial on the front surface. The black pattern is illuminated from the rear by a small electric lamp. Due in large part to the space requirements of the lighting source, optical targets with self-contained illuminating systems are relatively large and present serious limitations when the target must be positioned in a limited space, as for example, when the tooling target must be placed between a surface and the objective lens of a pointing, depth measuring microscope.

Front lighting of optical targets has been attempted in the prior art. However, classical front lighting techniques yield reduced optical contrast between the object being viewed and its background, and provides excessive brightness variation within the image due to spectral flares and shadows from surface imperfections. The fiducial of the tooling target, in other words, cannot be readily resolved from its background.

There are similar shortcomings in providing a target that may be advantageously used as a component of a novel optical spherometer to optically determine the compound curvature of an unknown surface. Traditionally, the unknown curvature of large, opaque diffuse surfaces are measured by mechanical spherometers. A mechanical spherometer usually includes three depending parallel legs defining a plane. A parallel micrometer screw is threadably advanceable and retractable at a known and fixed position between the legs. Once the three legs are rested on a work surface to be measured, the micrometer screw is moved until it contacts the work surface. The sagittal height or the distance between the defined plane and the contact point is thus measured by the micrometer screw, and this measurement is used through simple calculations to determine the curvature of the work surface.

In applications where only limited space is available, as for example between a work surface and a pointing microscope, the physical size of mechanical spherometers makes their use impractical. Furthermore, mechanical spherometers require contact between the micrometer screw and the center of the measured work surface with a force sufficient to be reproduceable. Regulation of this contact force is normally done by the "feel" of an operator and is very difficult to control and reproduce. In addition to introducing error into the sagittal height measurement, physical contact by the micrometer screw may damage the surface being measured. Moreover, for some applications, it is necessary to align the center line of a spherometer with the center line of an optical system very precisely, as for example within a few ten thousanths of an inch. Such precise alignment is beyond the capacity of any known mechanical spherometer.

In U.S. Pat. No. 3,180,216 to Osterberg, a variable phase microscope is disclosed for enhancing the contrast of an image being examined. The apparatus, which operates by rotation of a deviated light vector to obtain destructive interference with a transmitted light vector over the image of a particle, thereby enhancing the contrast between the particle and its surround, is complex. A laser is required and a plurality of coherent light beams are needed to illuminate the specimen. A multiapertured, opaque disc is utilized.

A frontally illuminated specimen is inspected in a system disclosed in U.S. Pat. No. 2,318,705 to Morgan. This patent teaches the use of polarizing elements, to filter reflected light from the objective of a microscope examining the specimen, in order to reduce fogging of the image. The disclosure does not, however, teach either a method or an apparatus for imaging the specimen against a bright background with frontal illumination. Rather, light reflected by an objective is illuminated by a polarizing screen, while light passing through the objective to the specimen is passed by the polarizing screen.

In U.S. Pat. No. 3,759,618 to Rogers et al, a method and apparatus is disclosed for determining the position of an optical grid by interpreting relative movement between two grating systems with moiré technology. The shadow of a grating is continuously cast onto a single photoelectric sensor through a plurality of subsections of a composite grid. Each of the subsections have the same line repeat dimension and orientation as the grating, but the lines are progressively shifted relative to the other subsections by chosen fractions of the line repeat dimension. The intensity of the grating shadow incident upon each of the grid subsections is then varied sinusoidally by alternating the polarization and direction and then providing selection filters over each of the different subsections so that respective maxima and minima of the sinusoidal variation at the various grid sections are then equally displaced. The output signal from the photoelectric sensor is then compared with a reference signal fluctuating sinusoidally in synchronism with the shadow intensity variation cycle.

SUMMARY OF THE INVENTION

Accordingly, it is a primary object of the invention to provide a frontally illuminated optical assembly with high visual contrast between a fiducial mark and its background.

It is another object of the invention to provide a relatively thin tooling target for easy disposition in the limited confines between an optical instrument and a work surface.

It is a further object of the invention to provide a portable tooling target wherein the displacement between a fiducial mark and a reference surface is kinematically repeatable.

Another object of the invention is to provide a magnetic tooling target securable to any magnetic surface.

Another primary object of the invention is to provide an optical spherometer for determining the radius of curvature of an unknown surface.

It is yet another object of the invention to provide a relatively thin high precision kinematic spherometer adequate for a wide range of surfaces.

A still further object of the invention is to provide an optical spherometer suitable for use on opaque, specular-reflective or diffuse surfaces.

Another object of the invention is to provide a frontally illuminated optical spherometer for providing fiducial mark reflections of exceptional contrast.

It is yet another object of the invention to provide a spherometer for optically measuring sagittal height without center contact with the work surface.

Yet another object of the present invention is to provide a spherometer with a kinematic magnetic mounting for incorporation into an optical measuring system.

It is still another object of the invention to provide a novel method of using a spherometer with an optical system to accurately measure a sagittal height.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purpose of the present invention disclosed herein, an improved optical tooling assembly is provided for presenting a high contrast frontally illuminated image. A frontally illuminated tooling target includes a fiducial mark for reflecting a beam of polarized light back toward the frontal direction with a first polarization. A polarizing element is positioned at the rear of the fiducial mark for effectuating a change in the polarization of any light bypassing the fiducial mark. A reflective surface positioned on the rear of the polarizing element reflects light passing through the polarizing element and directs the light back through a second pass of the polarizing element toward the frontal direction with a second polarization. The second polarization differs from the first polarization whereby the intensity of one of the first and second polarizations may be adjusted to be greater than the other to provide a visual contrast between light reflected from the fiducial mark and the reflective surface.

The tooling target preferably includes an optical flat disposed in front of the polarizing element with the fiducial mark being deposited on the optical flat. In a preferred form of the invention, the optical flat is formed of quartz and the fiducial mark consists of cross hairs formed of reflective chrome.

In accordance with one aspect of the invention, the polarizing element is formed of birefringent material.

In another aspect of the invention, the second polarizing element is a pleochloric material.

In accordance with a further aspect of the invention, a magnetic mounting base is provided for securing the fiducial mark, polarizing element and reflective surface. The magnetic mounting base preferably includes a first flat surface for mounting the optical assembly and a second flat surface, parallel to the first surface, adapted to interface with a ferromagnetic surface. In an alternative embodiment, an adhesive base is substituted to secure the tooling target in position.

In accordance to a further aspect of the invention, an optical spherometer is provided with a movable base defining a reference plane with at least three points of contact with the surface being checked. Preferably a peripheral knife edge provides contact substantially around the perimeter. An optical assembly is secured within the movable base. The optical assembly includes a fiducial mark operative to reflect polarized frontal light with a first polarization, the fiducial mark being centered to and in fixed predetermined relationship to the defined circular reference plane. A polarizing element is disposed to the rear of the fiducial mark for effectuating a change in polarization of any bypassing frontal light, and a reflective surface is disposed to the rear of the polarizing element to reflect light passing through the polarizing element back toward the frontal direction.

In accordance with a further aspect of the invention, the spherometer includes an optical flat with the fiducial mark being deposited thereon.

In accordance with yet another aspect of the invention, the optical spherometer includes a movable base with a sharp peripheral edge around the rear or back for defining the reference plane.

In a further aspect of the invention, the annular base includes a plurality of magnets disposed in spaced circumferential relationship about the base for securing the base to a ferromagnetic surface without physical contact between subject surface and said magnets.

In accordance to a still further aspect of the invention, the optical assembly is separately concentrically secured within the annular base, and selected adjustment screws are provided for positioning the optical assembly into concentric relationship.

In yet another aspect of the invention, a method is provided for determining the curvature of a surface with an optical spherometer. The optical spherometer is positioned by a movable base for defining a reference plane with at least three support points around the rear or back edge of the base and an optical assembly held in predetermined relationship to the defined reference surface. The optical assembly provides for focusing on a fiducial mark operative to reflect polarized frontal light with a first polarization and a polarizing element positioned to the rear of the fiducial mark. A reflective surface disposed to the rear (back) of the polarizing element reflects light back toward the frontal direction with a polarization differing from the light reflected from the fiducial mark. In performing the method, a depth measuring optical instrument is aligned with the surface of unknown curvature. The optical spherometer is inserted between the depth measuring instrument and the surface with at least three points in contact with the surface. The spherometer is then illuminated with frontal polarized light, and the intensity of the light reflected from the fiducial mark is altered with respect to the light reflected from the reflecting surface so as to provide an enhanced visual contrast for the fiducial mark. The depth measuring instrument, such as a microscope, is alternately focused on the fiducial mark and the surface beneath the fiducial mark to determine the distance therebetween. The change in depth between the fiducial mark and the surface is utilized to determine the radius of curvature for the unknown surface.

BRIEF DESCRIPTION OF THE DRAWINGS

The accompanying drawings, incorporated in and forming a part of the specification, illustrate several aspects of the present invention, and together with the description, serve to explain the principles of the invention. In the drawings:

FIG. 3 illustrates an optical tooling target and method utilizing the present invention;

FIG. 4 is a frontal view of the optical tooling target of FIG. 3;

FIG. 5 illustrates a further embodiment of a tooling target and method utilizing the present invention;

FIG. 6 is a frontal view of the optical tooling target of FIG. 5;

Reference will now be made in detail to the present preferred embodiments of the invention, examples of which are illustrated in the accompanying drawings.

DETAILED DESCRIPTION OF THE INVENTION

Figure 1:
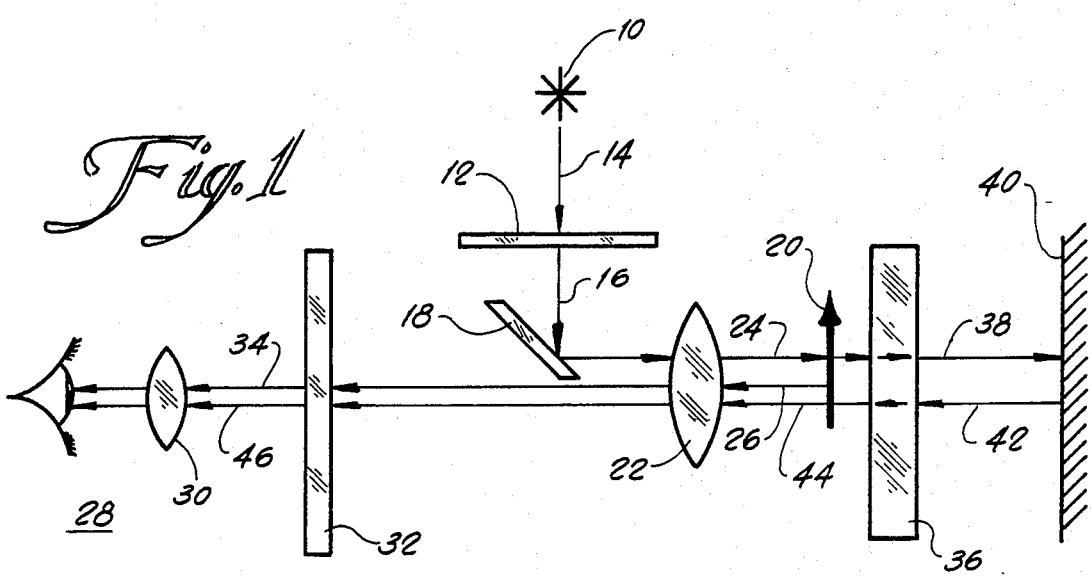
FIG. 1 illustrates an optical viewing system incorporating the front lighted shadowgraphic technique of the present invention.

Reference is now made to FIG. 1, showing the improved optical viewing system incorporating the front lighted shadowgraphic technique of my prior application and used to advantage in this invention. The invention employs the novel approach of applying a polarized beam of light to an object and reflecting that beam to an observation station. Portions of the beam which bypass the object and pass on to a background therefor are differently polarized for reflection to the same observation station. A polarization analyzer is placed between the sources of reflected light (i.e., the object and background) and the observation station in order to extinguish one of the two differently polarized reflected light beams, thereby providing an enhanced contrast silhouette image.

As seen in FIG. 1, an incident lighting source 10 is provided with a first polarizer 12. Following the path of a single light ray 14 emanating from light source 10, it is appreciated that subsequent to passage through polarizer 12, the light ray, now labeled 16, is polarized. Preferably, polarizer 12 is comprised of a quarter wave polarizing plate for the specific wavelength emanating from light source 10. A prism reflector 18 directs the polarized light rays at the object to be inspected, shown as 20 in the figure. An objective lens 22 is used to focus the light rays, shown at 24, on object 20.

The incident light ray 24 illuminates object 20 and is reflected thereby. For clarity, the reflected light ray 26 is shown in the figure in a separate path. The reflected light ray 26, similarly to the incident light ray 24, is linearly or plane polarized. This ray passes through the lens 22 and proceeds onward to an observation station 28. At observation station 28, a lens 30 may be provided for focusing the reflected image on an observer's eye. It is to be understood, however, that observation means other than the human eye may similarly be used. For example, an electronic solid state photosensor may be provided. Alternatively, a video or silver process camera may be used. In such circumstances, eyepiece lens 30 may not be required since the viewing camera is provided with its own optics.

Between the object and the observation station, a polarization analyzer 32 is provided. Linearly polarized light ray 26 thus passes through analyzer 32 prior to reaching the observation station as light ray 34. As will be appreciated by those skilled in the art, the orientation of analyzer 32 may be altered, thereby to vary the transmitted fraction of light ray 26, and consequently, the intensity of light ray 34. The reflected image of light source 10 provided by object 20 may thus be made progressively darker by appropriate orientation of analyzer 32.

Portions of incident light ray 24 which bypass object 20 are made to pass through a second polarizer 36. The light ray emanating from second polarizer 36 is shown at 38. A reflecting surface 40 is provided behind the second polarizer. Light ray 38 is reflected by surface 40 and is shown as a reflected light ray 42 which again passes through second polarizer 36. The polarization of light ray 42 is thus altered by polarizer 36 so that light ray 44 is provided with a polarization which differs from that of light ray 26. This result follows from the fact that light ray 26 maintains the polarization provided by first polarizer 12, while the polarization of light ray 44 includes the effects of first polarizer 12 and the double passage through second polarizer 36.

Light ray 44, similar to light ray 26, passes through analyzer 32 prior to reaching the observation station 28.

It should thus be appreciated that light rays 34 and 46, reaching the observation station 28, are differently polarized from one another by virtue of the different light paths traversed thereby from light source 10 to the observation station 28. Light ray 34 arrives at the observation station 28 after traversing a first path including first polarizer 12, prism reflector 18, objective lens 22, reflection by object 20, and passage through objective lens 22 and analyzer 32. Light ray 46, however, traverses a second path, having portions in common with the first path (polarizer 12, prism reflector 18, objective lens 22 and analyzer 32) as well as a distinct portion. The distinct portion of the second path results from bypassing object 20, passage through second polarizer 36, reflection by reflecting surface 40, and a second passage through second polarizer 36.

As previously described, the appropriate orientation of second polarizer 36 may be used to alter the intensity of light ray 34. Similarly, the orientation of analyzer 32 affects the intensity of light ray 46. Inasmuch as the two light rays have different polarizations from one another, it is possible by properly orientating the analyzer, to diminish the intensity of one of the light rays with respect to the other. More specifically, it is possible completely to extinguish one of the two light rays with respect to the other.

The invention accordingly provides for extinguishing the image of the object being inspected with respect to its background, or alternatively, for extinguishing the image of the background with respect to the object. In either case, contrast enhancement is obtained between the object and its background, thus providing a silhouette effect, having high contrast contours, with a front lighting arrangement.

In the preferred embodiment, second polarizer 36 may comprise any non-linear polarizer and may be either birefringent or pleochroic. For example, a pleochroic layer of polyimide (sold under the trademark Kapton by DuPont) may be used to provide the desired variation in the polarization of light ray 24.

In the particular example of the present invention, a Zeiss mica-plate quarter wave polarizer may be used for first polarizer 12. The light entering a microscope formed by objective lens 22 and eyepiece lens 30 encounters a Zeiss H-PR POL 473616 prism reflector and illuminates the object through the objective lens.

When the object is illuminated in such a manner, light is reflected back from the object to the microscope by the two mechanisms previously described. Specular light from the object essentially maintains the plane polarized characteristic of the light source, and a portion of the reflected light ray 26 passes the 473616 prism reflector and encounters analyzer 32 which may be of the type Zeiss 473662.

The portion of the incident plane polarized light represented by ray 24 which bypasss object 20 and passes through the second polarizer 36 undergoes a different process. Each passage through the polarizer provides an additional 20 degrees rotation to the major axis of the light beam's polarization through partial absorption of the extraordinary beam. Thus, light ray 38 is elliptically polarized, and reflected ray 42 is provided with an additional 20 degrees rotation upon passage through second polarizer 36. Accordingly, where polarization analyzer 32 is oriented at 90 degrees with ray 26, ray 34 is extinguished while ray 44 passes through the analyzer with insignificant loss, resulting in a bright field background for a crisp, shadow-like image of the opaque object.

Figure 2:
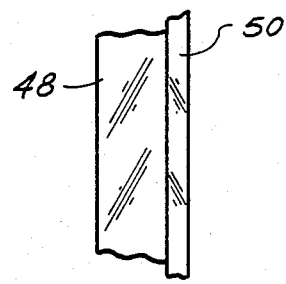
FIG. 2 shows structure in accordance with the invention for enabling existing optical systems with built-in polarizing elements to observe various devices in accordance with the principles of the invention.

Referring now to FIG. 2, a combination of a polarizing lamina 48 and a front mirror reflecting surface 50 is shown for application to an opaque object. A Kapton layer having a mirrored reflecting surface may be used to provide the desired combination. It should be appreciated that such a laminate may be applied to any opaque object and, by the principles hereinabove described, provide frontally illuminated shadowgraphic images in any optical instrument which includes polarized illuminating light and a polarization analyzer.

While the foregoing description of the present invention describes the use of a substrate formed of a sheet plastic material, and more specifically describes the use of the polyimide Kapton (trademark of DuPont) which has a pleochroic characteristic, it should be understood that dichroic or birefringent materials are equally valuable, and that moreover, any material providing a polarization to a light beam which differs from the polarization of the light beam incident on the opaque object mounted thereon is similarly useful. The second polarizer thus may be linear or non-linear, the latter term encompassing both elliptical and circular polarizers, although non-linear polarizers are preferred. Further, the reflecting surface 40 is preferably in intimate contact with the second polarizer, although such intimate contact is not necessary to practice the invention.

It should be understood that the reflector 18 may be a prism reflector or a partially silvered mirror. The reflector may extend through half the optical diameter of the instrument and may be completely opaque or may be partially reflecting and extend through the entire optical path. In order to avoid multiple reflections, it is preferred that the reflecting surface behind the second polarizer 36 be a frontal reflecting surface. The reflective surface may be physical vapor deposited on the rear surface of the second polarizer.

Applicant has found that the front lighted shadowgraph technique of the invention may be used advantageously in conjunction with an optical tool, such as a pointing, depth measuring microscope, to locate a point on a plane. Referring to FIG. 3, a relatively thin tooling target 52 including an optical assembly 53 comprising an optical flat 54 backed by a polarizing film 56 and a reflective surface 58 is shown in FIG. 3. The optical assembly 53 is mounted on a first flat surface 59 ground on a toroidal ceramic magnet 60. The optical assembly mounting surface 59 is parallel to a work mounting surface 61 for mounting the magnet 60 to a work reference surface 63. As illustrated, the magnet 60 provides an easily repeated kinematic attachment with three degrees of freedom for mounting the tooling target 52 to any flat ferromagnetic or flat horizontal surface 63.

In the preferred embodiment of tooling target 52, the optical flat 54 is formed of quartz approximately 1.0 mm thick and 21 mm in diameter. As illustrated in FIG. 4, chrome cross hairs, preferably of 0.01 mm thickness, are deposited on flat 54 forming fiducial means. The thickness of the polarizing film 56, preferably a film of polyimide (as, for example Kapton) is arbitrary, except that the thickness must not be an integer multiple of the equivalent one quarter wave length for the incident light.

The reflective surface 58 is preferably a front surfaced aluminized Mylar film. Optical grease may optionally be used to improve the coupling between the elements of the optical assembly 53 (54, 56, 58) and to minimize reflected light losses between the optical interfaces in front of the reflective surface 58. In practice, an optical grease having an index of refraction approximating the refractive index for quartz, such as Q2-3067 optical couplent sold by Dow Corning has been used successfully. This arrangement ameliorates air layer impedence mismatches between the quartz flat 54, Kapton film 56 and aluminized Mylar surface 58. While the preferred reflective surface 58 is a front surfaced mirror, it should also be appreciated that back surfaced mirrors may also be used. In fact, the virtual image of a light source in back surfaced mirrors provides an improved silhouette for some patterns. However, multiple image problems arising from first surface reflections are avoided with front surfaced mirrors.

As indicated above, the illustrated tooling target 52 is designed for use with a pointing, depth measuring microscope. When lighted by a front lighted polarized incident light source 64, the tooling target 52 is viewed by a microscope, such as a Zeiss Epiplan microscope 66 having plane polarizing and analyzer accessories. The polarized light illuminates the fiducial means, such as cross hairs 62, and is reflected. The cross hairs 62 are actually formed as a layer of chrome on the rear surface of the optical flat 54 (see FIGS. 3-6). The light reflected by the cross hairs 62, like the light emitted from source 64, is plane polarized. Portions of the incident light from source 64 bypass the cross hairs 62 and are reflected by the aluminized Mylar film surface 58. However, those portions of the light reflected by surface 58 reach the microscope 66 only after twice passing through the polarizing film 56. Thus, as light reflected from surface 58 reaches the microscope 66, it is differently polarized from the light reflected by the cross hairs 62. When the polarizing accessories of the microscope are properly adjusted, light reflected from the cross hairs 62 is completely shut off and appears in near perfect optical contrast as a black cross against a white background developed by the light reflected from the mirror.

The 0.01 mm cross hair lines of the preferred embodiment can easily satisfy contemporary state of the art resolution requirements for automatic alignment in microlithography, (500 mm, level to level registration) if the cross hair lines are smooth and straight. The cross hairs 62 are preferably made of chrome due to its durability and excellent edge definition. In prior art optical targets, the high spectral reflectively of chrome sometimes prohibits its use or necessitates an additional layer of chromiuum oxide on the cross hairs 62. However, the shiny mirror quality of chrome is an asset when using the front lighted shadowgraph technique of the present invention.

The position of the cross hairs 62 of the preferred embodiment is also certifiable relative to the work reference surface 63. The optical flat 54 may be ground flat and parallel from a quartz substrate to within a few angstroms. Once mounted and assembled in the magnet 60, the flatness and parallelness of mounting surfaces 59 and 61 can be certified by standard optical flat techniques. The certifiable displacement of the cross hairs is determined by alternatively focusing the depth measuring microscope 66 on the work reference surface 63 and then on the cross hairs 62. The Zeiss Epiplan microscope of the preferred embodiment can make such measurements to an accuracy of 1.0 micrometer.

As depicted in FIGS. 5 and 6, the tooling target 52 of the present invention can also be made as a "pastie," without the magnetic mounting 60. In this configuration, the optical assembly 53 can be adhesively attached by double sided tape disc 67 to any surface and becomes a low cost fiducial of any required pattern and of exceptional brightness and contrast. In either the magnetic mounted or "pastie" form, the tooling target 52 is a very thin, passive device of at least equal quality within all known tooling targets with self-contained lighting. The contrast of the cross hairs 62 (FIG. 6) during viewing is superior to known passive tooling targets with classical front lighting.

In some applications, the fiducials are required to be in the exact focal plane of the work reference surface 63. In such situations, the finite thickness of the film 56 and surface 58 become appreciable. However, this design could be built into any precision pattern on a transparent substrate by including the fiducial in the pattern and adding the polarizing film 56 and reflective surface 58 to the rear side. This built-in arrangement would be effective where back lighting is precluded because of stereo hindrances or where the reference surface is opaque.

Figure 7:
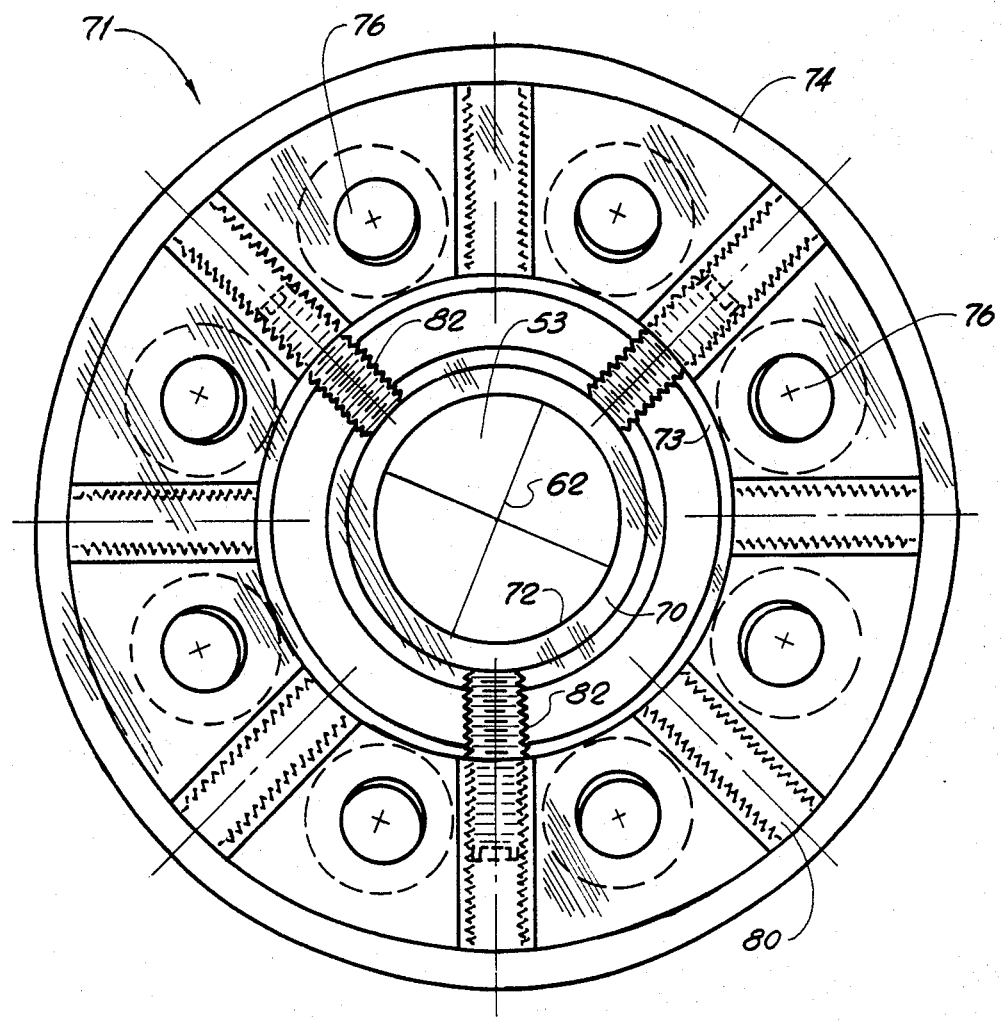
FIG. 7 is a frontal view of an optical spherometer utilizing the present invention.

The optical assembly 53 has further utility as a component of an optical spherometer for measuring the compound curvature of an unknown surface in conjunction with a depth measuring microscope. The spherometer 71 illustrated in FIG. 7 shows the optical assembly 53 with the flat 54, film 56 and reflective surface 58 supported about its periphery in a recess of a annular support 70 having a retaining shoulder 72. The support 70 is preferably formed of a light material, such as magnesium, and is concentrically supported within a central opening 73 of a steel mounting ring 74. As illustrated, the steel ring 74 has eight ceramic magnets 76 in an equally spaced circumferential arrangement about the ring 74. These magnets 76 are fixed in cavities 78 seperated by radially extending threaded openings 80. Set screws 82 extend through three selected openings 80 in supporting contact with the support 70. The set screws 82 are adjustable and operative to concentrically adjust and align the support 70 and optical assembly 53 within the opening 73.

Figure 8:
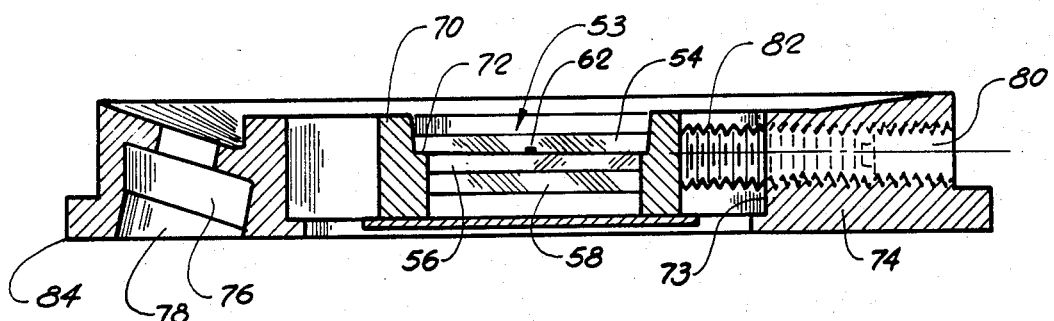
FIG. 8 is a cross sectional view of the optical spherometer of FIG. 7.

As seen in FIG. 8, the steel mounting ring 74 has a circular knife edge 84 extending peripherally around the ring 74 for contacting a spherical surface in at least three points and defining a spherometer plane.

In a theorically perfect sphere the knife edge 84 does, of course, engage around its full perimeter. In any case, the mounting ring 74 is stabilized in position in an advantageous manner. Once adjusted, set screws 82 support the optical assembly 53 providing the target in fixed certifiable relationship to the spherometer plane defined by the contact points of the knife edge 84. The magnets 76 are slightly displaced from the spherometer plane and are operative to secure the ring 74 to any ferromagnetic surface.

In use, the optical spherometer 71 is placed between a depth measuring microscope or other depth measuring optical instrument and a surface to be measured. After aligning the spherometer 71 with the optics of the microscope, the microscope is focused upon the cross hairs 62. The spherometer 71 is then removed without altering the position of either the microscope or the work surface and the microscope is refocused upon the work surface immediately below the cross hairs 62. Since the distance between the optical assembly 53 and the spherometer plane defined by knife edge 84 is fixed and certifiable, the measured distance between the two focus locations provides a measure of the sagittal height. Further, given the known diameter of the ring 74, the sagittal height measurement may be used in a well known manner to determine the radius of curvature. The Zeiss Epiplan microscope of the preferred embodiment, as noted above, is capable of making such measurements to an accuracy of 1.0 micrometer. Thus, while the reference plane of the spherometer 71 is established by at least three point contact, the sagittal height is measured by optical means, minimizing the possibility of error and avoiding physical damage to the work surface.

Significantly, the light provided for focusing the microscope on the cross hairs 62 is polarized light frontally directed onto the optical assembly 53. Focusing upon the cross hairs is substantially aided by the sharp visual contrast afforded by the front lighted shadowgraphic technique of the invention.

In summary, numerous benefits have been described which result from employing the concepts of the invention. The optical tooling target is relatively thin and may be readily located between a work surface and a microscope. The frontally illuminated shadowgraphic images produced by the tooling target are of high visual contrast and high resolution to greatly facilitate focusing of a depth measuring microscope. The displacement of the fiducial (cross hairs) is certifiable with respect to a reference work surface. When the tooling target includes a magnetic holder, the displacement of the fiducial from the work surface is kinematically repeatable on ferromagnetic flat surfaces or on any flat horizontal surfaces.

The high precision spherometer of the invention is substantially thinner than prior art spherometers and may be placed between a surface being measured and an optical instrument, such as a depth measuring microscope. Significantly, the spherometer of the invention provides for non-contact measurement of the sagittal height, avoding errors inherent in regulating the contact force and damage to the measured surface. Further, the spherometer is effective regardless as to whether the unknown surface is transparent or opaque and regardless as to whether the surface is specular-reflective or diffuse. Moreover, extraordinary precision in the centering of the spherometer with an arbitrary sagittal height radius is possible. Also, the use of optical means for measuring the sagittal height provides for extraordinary precision.

Still further, the spherometer is inexpensive to manufacture and calibrate.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A frontally illuminated optical tooling target, comprising:
   (a) fiducial means for reflecting a beam of polarized light from a frontal direction back toward the frontal direction with a first polarization;
   (b) a polarizing element positioned at the rear of said fiducial means for effecting a change in the polarization of any of said frontal light bypassing the fiducial means and passing through the polarizing element;
   (c) a reflective surface positioned on the rear of said polarizing element for reflecting light passing through said polarizing element back through a second pass of the polarizing element toward the frontal direction with a second polarization, the second polarization differing from the first polarization, whereby upon adjustment of the intensity of one of the first and second polarizations so as to be greater than the other an optical contrast is provided between the light reflected from the fiducial means and the reflective surface.

2. A frontally illuminated optical tooling target as recited in claim 1 further including an optical flat disposed in front of said polarizing element for supporting said fiducial means.

3. A frontally illuminated optical tooling target as recited in claim 2 wherein said fiducial means is a mark formed of a reflective chrome layer, said optical flat being formed of quartz.

4. A frontally illuminated optical tooling target as recited in claim 3 wherein said mark comprises cross hairs on the rear of the flat.

5. A frontally illuminated optical tooling target as recited in claim 3 wherein optical grease is disposed between the quartz optical flat, the polarizing element and the reflective surface to ameliorate air layer optical impedance mismatches therebetween.

6. A frontally illuminated optical tooling target as recited in claim 5 wherein said reflective surface includes an aluminized film.

7. A frontally illuminated optical tooling target as recited in claim 1 wherein the polarizing element is dichroic.

8. A frontally illuminated optical tooling target as recited in claim 7 wherein the polarizing element includes a sheet of transparent polyamide.

9. A frontally illuminated optical tooling target as recited in claim 1 wherein there is further provided adhesive means to mount the target for use.

10. A frontally illuminated optical tooling target as recited in claim 1 wherein the adhesive means comprises a double-sided adhesive disc on the rear of the target.

11. A frontally illuminated optical tooling target as recited in claim 1 further including a magnetic mounting means, said fiducial means, polarizing element and reflective surface being supported by said magnetic mounting means for use.

12. A frontally illuminated optical tooling target as recited in claim 11 wherein said magnetic mounting means includes parallel first and second mounting surfaces, said mark, polarizing element and reflective surface being positioned with respect to said first mounting surface and said second mounting surface being disposed to the rear of said reflective surface and adapted to interface with a ferromagnetic surface.

13. A frontally illuminated optical tooling target as recited in claim 12 further including an optical flat, said fiducial means being a deposited layer on said optical flat.

14. A frontally illuminated optical tooling target as recited in claim 13 wherein said optical flat is quartz and said deposited layer includes reflective chrome cross hairs.

15. An optical spherometer, comprising:
   (a) a movable base for defining a reference plane with at least three points at the rear of the base engageable with a spherical surface to be checked; and
   (b) an optical assembly secured within the movable base, said optical assembly including fiducial means in fixed predetermined relationship to said defined reference plane, said fiducial means being operative to reflect polarized frontal light with a first polarization, a polarizing element disposed to the rear of said fiducial means for effecting a change in the polarization of any frontal light bypassing the fiducial means, a reflecting surface disposed to the rear of the polarizing element to reflect frontal light passing through the polarizing element back through the polarizing element toward the frontal direction.

16. An optical spherometer as recited in claim 15 further including an optical flat, the fiducial means being a deposited layer on the optical flat.

17. An optical spherometer as recited in claim 16 wherein said movable base includes a sharp peripheral edge at the rear of the base for defining the reference plane.

18. An optical spherometer as recited in claim 17 wherein the base is annular and further including a plurality of magnets disposed in spaced circumferential relationship about the base for securing the base to a ferromagnetic surface.

19. An optical spherometer as recited in claim 18 wherein the optical assembly is concentrically secured within the annular base and further including adjustment means for positioning the optical assembly into concentric relationship with the annular base.

20. A method of determining the curvature of a surface using an optical spherometer having a movable base for defining a reference plane with at least three points at the rear of the base, and an optical assembly in fixed predetermined relationship to the defined reference plane and said at least three points, the optical assembly including: fiducial means operative to reflect polarized frontal light with a first polarization; a polarizing element disposed to the rear of said fiducial means for effecting a change in the polarization of frontal light bypassing the fiducial means; and a reflective surface disposed to the rear of the polarizing element to reflect frontal light passing through the polarizing element back through the polarizing element toward the frontal direction with a second polarization, the method comprising:

(a) aligning an optical depth measuring instrument with a surface of unknown curvature;

(b) inserting the optical spherometer between the depth measuring instrument and the surface with said at least three points in contact with the surface;

(c) illuminating the spherometer with frontal polarized light and adjusting the intensity of the reflected light of first and second polarization;

(d) utilizing the depth measuring insrument to measure the distance to the fiducial means;

(e) utilizing the depth measuring instrument to measure the distance to the surface after removing the spherometer;

(f) determining the difference in depth between the fiducial means and the surface; and (g) utilizing the determined difference to determine the radius of curvature.

* * * * *